(12) United States Patent
Flandermeyer et al.

(10) Patent No.: US 8,802,225 B2
(45) Date of Patent: Aug. 12, 2014

(54) ARTICLE HAVING VITREOUS MONOCOATING

(75) Inventors: Brian K. Flandermeyer, Rocky Hill, CT (US); Kathleen E. Sinnamon, Manchester, CT (US); Erica Prevost, Kensington, CT (US)

(73) Assignee: United Technologies Corporation, Hartford, CT (US)

( * ) Notice: Subject to any disclaimer, the term of this patent is extended or adjusted under 35 U.S.C. 154(b) by 508 days.

(21) Appl. No.: 13/149,533

(22) Filed: May 31, 2011

(65) Prior Publication Data

US 2012/0308834 A1 Dec. 6, 2012

(51) Int. Cl.
| | |
|---|---|
| *B32B 17/06* | (2006.01) |
| *C03C 14/00* | (2006.01) |
| *C04B 41/50* | (2006.01) |
| *C04B 41/00* | (2006.01) |
| *C04B 41/86* | (2006.01) |
| *C04B 35/565* | (2006.01) |
| *C04B 35/584* | (2006.01) |
| *C04B 35/80* | (2006.01) |
| *C04B 41/45* | (2006.01) |
| *F01D 9/02* | (2006.01) |
| *F01D 9/04* | (2006.01) |
| *F01D 11/00* | (2006.01) |
| *F01D 5/28* | (2006.01) |

(52) U.S. Cl.
CPC ........... *C04B 41/5022* (2013.01); *C04B 41/009* (2013.01); *C04B 41/86* (2013.01); *C04B 35/565* (2013.01); *C04B 35/584* (2013.01); *C04B 35/806* (2013.01); *C04B 41/4535* (2013.01); *C04B 41/4554* (2013.01); *F01D 9/02* (2013.01); *F01D 9/04* (2013.01); *F01D 11/00* (2013.01); *F01D 5/288* (2013.01); *F05D 2300/6033* (2013.01); *F05D 2300/2102* (2013.01)
USPC .............. 428/305.5; 428/312.2; 428/366; 428/428; 428/446; 428/699; 428/702

(58) Field of Classification Search
None
See application file for complete search history.

(56) References Cited

U.S. PATENT DOCUMENTS

| | | | | | |
|---|---|---|---|---|---|
| 5,605,868 | A | * | 2/1997 | Chyung et al. | 501/8 |
| 5,622,751 | A | * | 4/1997 | Thebault et al. | 427/376.2 |
| 5,725,955 | A | * | 3/1998 | Tawil et al. | 428/408 |
| 6,177,186 | B1 | * | 1/2001 | Skoog et al. | 428/325 |
| 6,331,362 | B1 | * | 12/2001 | Dupel et al. | 428/689 |

(Continued)

FOREIGN PATENT DOCUMENTS

| | | | | |
|---|---|---|---|---|
| EP | 2289863 | | 3/2011 | |
| JP | 2002241961 | A * | 8/2002 | C23C 28/00 |
| JP | 2006143553 | | 6/2006 | |
| WO | WO 2010112768 | A1 * | 10/2010 | |

OTHER PUBLICATIONS

Kandebo, S. (1998). Geared-turbofan engine design targets cost, complexity, aviation week & space technology. New York: Aviation Week & Space Technology, 148(8).

(Continued)

*Primary Examiner* — David Sample
(74) *Attorney, Agent, or Firm* — Carlson, Gaskey & Olds, P.C.

(57) ABSTRACT

An article includes a ceramic matrix composite substrate with a heat-exposure surface and a monocoating disposed directly on the heat-exposure surface. The monocoating includes vitreous glass to seal the ceramic matrix composite from the surrounding environment.

24 Claims, 2 Drawing Sheets

(56) References Cited

U.S. PATENT DOCUMENTS

| | | |
|---|---|---|
| 7,341,797 B2 | 3/2008 | Spitsberg et al. |
| 7,429,424 B2 | 9/2008 | Boutwell et al. |
| 7,595,114 B2 | 9/2009 | Meschter et al. |
| 7,648,605 B2 | 1/2010 | Merrill et al. |
| 7,867,575 B2 | 1/2011 | Boutwell et al. |
| 2006/0269759 A1* | 11/2006 | Bayer et al. ............ 428/426 |
| 2007/0298277 A1* | 12/2007 | Darolia et al. ............ 428/632 |
| 2009/0004427 A1* | 1/2009 | Sarrafi-Nour et al. ........ 428/76 |
| 2009/0297718 A1* | 12/2009 | Sarrafi-Nour et al. ........ 427/377 |
| 2011/0027470 A1 | 2/2011 | Kirby et al. |
| 2011/0027517 A1 | 2/2011 | Kirby et al. |
| 2011/0027559 A1 | 2/2011 | Kirby et al. |
| 2012/0063912 A1* | 3/2012 | Bouillon et al. .......... 416/241 B |

OTHER PUBLICATIONS

Gunston, B. (2000). Jane's aero-engines. Pratt & Whitney/USA. Issue 7.

Fledderjohn, K. (1983). The TFE731-5: Evolution of a decade of business jet service. Business Aircraft Meeting & Exposition. Wichita Kansas. Apr. 12-15, 1983.

\* cited by examiner ns to an engine static structure 36 via several bearing systems 38. The fan section 22 and the compressor section 24 are concentric with the engine central longitudinal axis A. The low speed spool 30 generally includes an inner shaft 40 that is coupled with a fan 42, a low pressure compressor 44 and a low pressure turbine 46. The low pressure turbine 46 drives the fan 42 through the inner shaft 40 and a gear assembly 48, which allows the low speed spool 30 to drive the fan 42 at a different (e.g. lower) angular speed.

ARTICLE HAVING VITREOUS MONOCOATING

BACKGROUND

This disclosure relates ceramic-based articles that are subject to severe operating environments.

Turbine engine components typically operate under severe environmental conditions. For example, the environment includes exposure to high temperatures and corrosive/oxidative and erosive conditions from combustion gases.

To improve durability, the component may be coated with an environmental or thermal barrier coating system. The barrier coating system is a multi-layer coating that includes one or more ceramic layers, such as stabilized zirconia, and one or more metallic bond coat layers between the ceramic layers and the component. The ceramic layers serve as a thermal and erosion barrier, and the bond coat layers serve to adhere the ceramic layers to the component.

SUMMARY

Disclosed is an article that includes a ceramic matrix composite substrate having a heat-exposure surface. A monocoating is disposed directly on the heat-exposure surface. The monocoating includes vitreous glass, to seal the ceramic matrix composite from the surrounding environment.

In another aspect, an article includes a ceramic matrix composite substrate having a heat-exposure surface and a monocoating disposed directly on the heat-exposure surface. The monocoating consists of vitreous glass.

In a disclosed example, the turbine engine article is included within a gas passage of a turbine engine.

The various features and advantages of the disclosed examples will become apparent to those skilled in the art from the following detailed description. The drawings that accompany the detailed description can be briefly described as follows.

DETAILED DESCRIPTION

Figure 1:
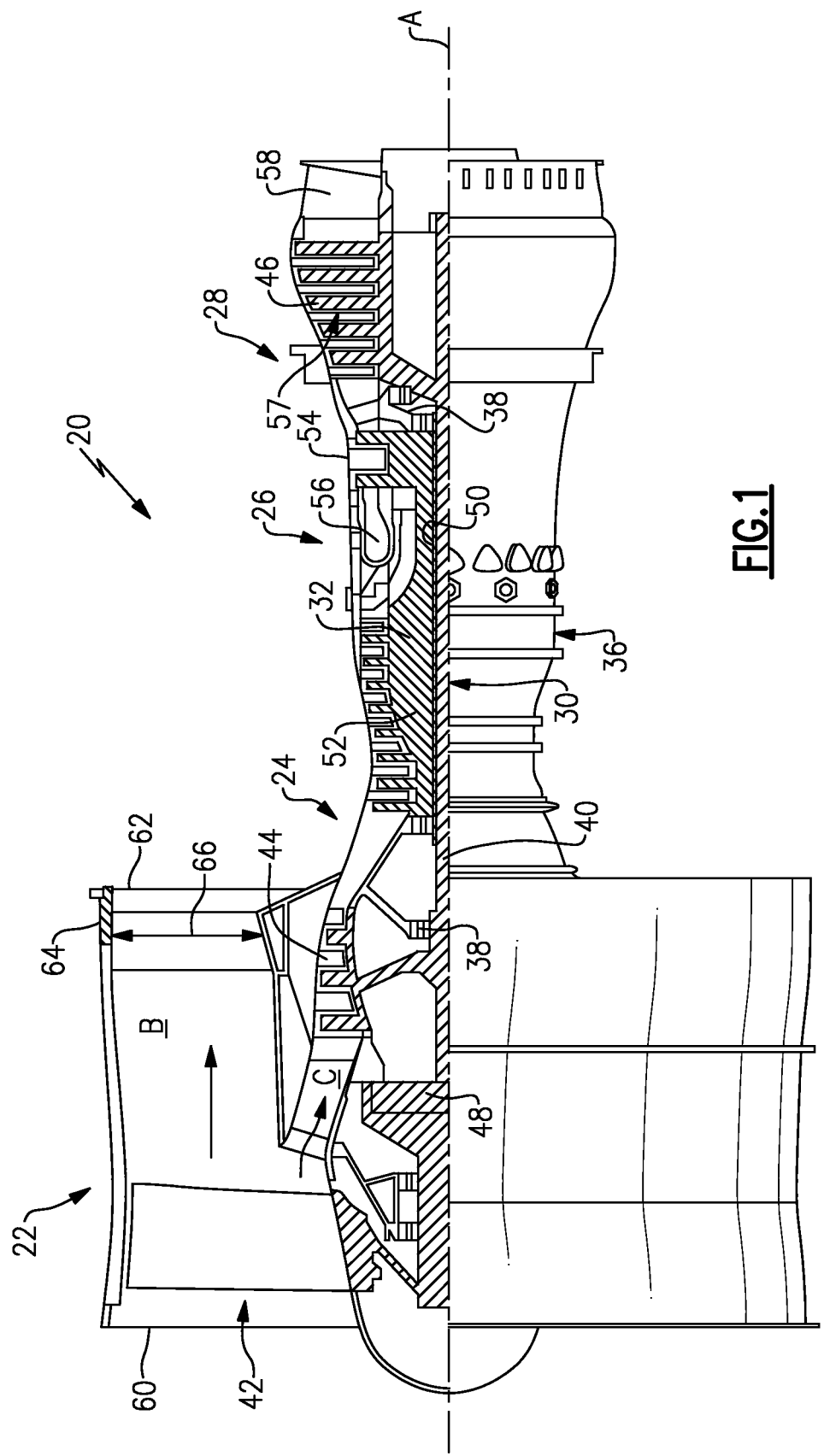
FIG. 1 shows an example turbine engine having a article that includes a monocoating with vitreous glass.

FIG. 1 schematically illustrates a gas turbine engine 20. In the illustrated example, the gas turbine engine 20 is a two-spool turbofan that generally incorporates a fan section 22, a compressor section 24, a combustor section 26 and a turbine section 28. Although depicted as a turbofan gas turbine engine, it is to be understood that the concepts described herein are not limited to use with the disclosed arrangement. Alternative engine architectures, such as a single-spool design, a three-spool design, an open rotor design, or a ground-based turbine engine that does not include a fan section, will also benefit from the examples disclosed herein.

The fan section 22 drives air along a bypass flow passage B while the compressor section 24 drives air along a core flow passage C for compression and communication into the combustor section 26.

The engine 20 in this example includes a low speed spool 30 and high speed spool 32 mounted for rotation about an engine central longitudinal axis A relative to an engine static structure 36 via several bearing systems 38. The fan section 22 and the compressor section 24 are concentric with the engine central longitudinal axis A. The low speed spool 30 generally includes an inner shaft 40 that is coupled with a fan 42, a low pressure compressor 44 and a low pressure turbine 46. The low pressure turbine 46 drives the fan 42 through the inner shaft 40 and a gear assembly 48, which allows the low speed spool 30 to drive the fan 42 at a different (e.g. lower) angular speed.

The high speed spool 32 includes an outer shaft 50 that is coupled with a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

A core airflow is received into a core flow passage C and is compressed in the low pressure compressor 44 then the high pressure compressor 52, mixed with the fuel and burned in the combustor 56, and then expanded through a gas passage 57 over the high pressure turbine 54 and low pressure turbine 46 before being discharged through a nozzle 58. The gas passage 57 leads from the combustor section 26 and includes the turbine section 28 and nozzle 58. The turbines 54, 46 rotationally drive the respective low speed spool 30 and high speed spool 32 in response to the expansion.

As shown, the fan 42 is arranged at an inlet 60 of the bypass flow passage B and the core flow passage C. Air flow through the bypass flow passage B exits the engine 20 through an outlet nozzle 62. The engine 20 optionally includes a variable area nozzle 64 within the bypass flow passage B. The variable area nozzle 64 is operative to change a cross-sectional area 66 of the outlet nozzle 62 to thereby control a pressure ratio across the fan 42 via changing pressure within the bypass flow passage B.

Figure 2:
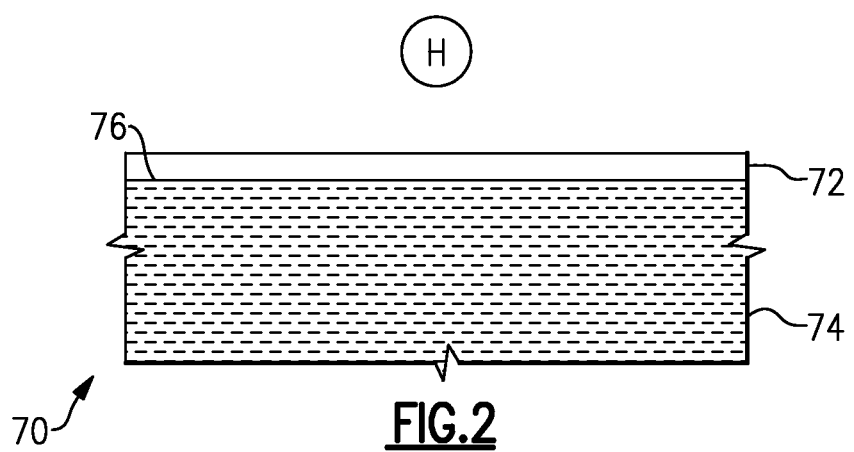
FIG. 2 shows an example article that includes a monocoating with vitreous glass.

FIG. 2 illustrates an example portion of a article 70 (i.e., a composite article) that is used in the gas passage 57 of the gas turbine engine 20. In a few examples, the article 70 is or is a portion of the nozzle 58, the static structure 36 (e.g., seals), a blade, a vane, or other component that has heat-exposure surfaces in the gas passage 57 of the gas turbine engine. It is to be understood though, that the article need not be a turbine engine article and that other articles, such as those used in gasification reactor systems, will also benefit from the examples of this disclosure.

In one example, the heat-exposure surface is directly exposed to the combustion gases and thereby forms a wall of the gas passage 57, such as a seal. In another example, the heat-exposure surface is not directly exposed to the combustion gases. In general, the temperature of the environment at the heat-exposure surface is greater than approximately 1000° F./538° C., and in some examples exceeds approximately 1500° F./816°C. or is greater than 3272° F./1800° C. As will be described, the article 70 includes a monocoating 72 for protecting an underlying substrate 74 from the high-temperature environmental conditions within the gas turbine engine 20. The term "monocoat" or variations thereof refers to a single layer coating system that is free of layers that are different from the single layer in at least one of composition or microstructure. In other words, the monocoating 72 is the only coating on the substrate 74 and there are no other coatings of different composition or microstructure and there is no need for traditional metallic bond coats.

In the illustrated example, the article 70 includes the substrate 74 and the monocoating 72 disposed directly on a heat-exposure surface 76 of the substrate 74. In the illustrated example, the heat-exposure surface 76 is located on one side of the article 70, however, in other examples that are not shown, the monocoating 72 entirely encases the article or is coated onto multiple sides or surfaces of the article while other sides or surfaces remain free of the monocoating 72.

The substrate 74 includes a ceramic matrix composite material or, alternatively, includes only the ceramic matrix composite material. The term "ceramic matrix composite" refers to a composite material of two or more phases, and one of the phases is a continuous phase of ceramic material.

Figure 3:
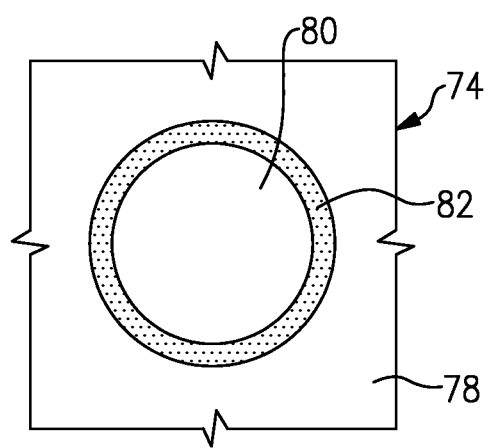
FIG. 3 shows a portion of an example ceramic matrix composite.

Referring to FIG. 3, a portion of the substrate 74 is shown. In this example, the substrate 74 includes a continuous ceramic matrix phase 78, a fiber phase 80 and an interface coating 82 between the matrix phase 78 and the fiber phase 80. In general, the interface coating 82 provides a desired degree of interfacial bonding between the matrix phase 78 and the fiber phase 80. In a further example, the interface coating 82 includes boron, such as boron nitride.

In a further example, the continuous ceramic matrix phase 78 includes a silicon-containing ceramic material. In one example, the silicon-containing ceramic material includes silicon carbonitride. The silicon carbonitride is a compound that includes covalently bonded silicon, carbon and nitrogen atoms. Depending upon the particular starting materials and processing techniques used to form the ceramic matrix phase 78, the composition of the silicon carbonitride may be varied.

The boron-containing material of the interface coating 82 relatively easily converts to oxide upon exposure to moisture and heat in the operation of the gas turbine engine 20. The monocoating 72 functions as a seal and thermal barrier to protect the boron-containing material, or other example materials of the substrate 74, from moisture intrusion and degradation.

To facilitate the sealing, the monocoating 72 includes vitreous glass. The vitreous glass is an amorphous solid material and impedes movement of moisture through the monocoating 72 to the underlying substrate 74. In some examples, the moisture does not diffuse at a high rate through the vitreous glass, and the slow diffusion of the moisture impedes movement to the substrate 72. In another example, the moisture must diffuse around regions of the vitreous glass and the tortuous diffusion path impedes movement of the moisture to the substrate 72.

In one example, the monocoating 72 includes the vitreous glass in combination with other phases. For example, the vitreous glass is a discrete phase or region within a continuous matrix of a different material, which is not necessarily a vitreous glass. For example, the matrix material is a ceramic material, such as an oxide-ceramic.

In another example, the vitreous glass is a continuous matrix phase in which a discrete phase of another material is dispersed. The discrete phase of material is not necessarily a vitreous glass. For example, the discrete phase is a ceramic material, such as an oxide-ceramic.

In another alternative, the monocoating 72 includes only the vitreous glass material, to the exclusion of other phases of different composition or different microstructure, with the exception of trace impurities. In other words, the monocoating 72 in this example is a homogenous layer of vitreous glass.

In the given examples, the vitreous glass comprises glassy silica, a polysilazane-derived glass, a silicate glass, such as aluminosilicate, a ceramic frit-derived glass or combinations thereof. For instance, the monocoating 72 includes the example glass materials alone or in combination, or alone or in combination to the exclusion of other phases of different composition and/or microstructure.

The vitreous glass of the monocoating 72 is applied to the substrate 74 of the turbine engine article 70 using one or more known deposition techniques. The selected deposition technique may depend upon the type of glass that is selected for the vitreous glass of the monocoating 72. In one example, the deposition technique uses a preceramic polymer material. The preceramic polymer material is applied to the heat-exposure surface 76 of the substrate 74 and is subsequently heated to chemically convert the preceramic polymer by decomposition reaction to the vitreous glass. For example, the temperature and environmental gas composition is selected to decompose the polysilazane to vitreous glass rather than a crystallized composition. In that regard, the vitreous glass is considered to be a polysilazane-derived glass. Glasses that are derived from polysilazane include silicon, carbon, nitrogen, oxygen or combinations of these elements but could also include other elements.

In another example, the deposition technique involves the use of colloidal silica. In this technique, silica particles (e.g., silica spheres) are suspended within a carrier fluid to produce a slurry. The slurry is applied to the heat-exposure surface 76 of the substrate 74. The carrier fluid is removed from the slurry, leaving the silica particles on the heat-exposure surface 76. The silica particles are then heated to consolidate the particles and thereby form the monocoating 72 containing vitreous glass.

In another example deposition technique, a ceramic frit material is used to form the vitreous glass of the monocoating 72. In this example, the ceramic frit is directly applied to the heat-exposure surface 76 or applied as a slurry in a carrier fluid. If a carrier fluid is used, the fluid is then removed, leaving the ceramic frit on the heat-exposure surface 76. The ceramic frit is then heated to consolidate it to form the monocoating 72.

In the above techniques that utilize a slurry, the slurry may be sprayed or painted onto the heat-exposure surface 76 using known techniques. In the disclosed examples, the monocoating 72 is applied in a thickness that is suitable to seal the underlying substrate 74. The selected thickness could depend upon the type of vitreous glass selected for the monocoating 72. In general, the thickness of the monocoating 72 is from approximately 0.254 millimeters up to several millimeters, and the monocoating 72 is thin relative to the size of the turbine engine article 70.

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGS. or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. An article comprising:
 a substrate comprising a ceramic matrix composite and having a heat-exposure surface; and
 a monocoating disposed directly on the heat-exposure surface, the monocoating comprising vitreous glass in a discrete phase dispersed in a continuous matrix.

2. The article as recited in claim 1, wherein the vitreous glass comprises glassy silica.

3. The article as recited in claim 1, wherein the vitreous glass comprises polysilazane-derived glass.

4. The article as recited in claim 1, wherein the vitreous glass comprises silicate glass.

5. The article as recited in claim 4, wherein the silicate glass comprises aluminosilicate.

6. The article as recited in claim 1, wherein the ceramic matrix composite includes a continuous ceramic matrix phase, a fiber phase within the matrix phase and an interface coating between the matrix phase and the fiber phase.

7. The article as recited in claim 6, wherein the interface coating comprises boron.

8. The article as recited in claim 6, wherein the continuous ceramic matrix phase comprises a silicon-containing ceramic material.

9. The article as recited in claim 6, wherein the fiber phase comprises silicon carbide fibers.

10. The article as recited in claim 1, wherein the vitreous glass comprises ceramic frit-derived glass.

11. The article as recited in claim 1, wherein the continuous matrix is a ceramic material.

12. The article as recited in claim 1, wherein the continuous matrix is an oxide ceramic material.

13. The article as recited in claim 12, wherein the ceramic matrix composite includes a continuous ceramic matrix phase, a fiber phase within the matrix phase and an interface coating between the matrix phase and the fiber phase, the interface coating comprising boron, and the monocoating sealing the boron of the interface coating from moisture.

14. The article as recited in claim 1, wherein the monocoating encases the substrate.

15. An article comprising:
a ceramic matrix composite substrate having a heat-exposure surface; and
a monocoating disposed directly on the heat-exposure surface, the monocoating consisting of a vitreous glass in a discrete phase dispersed in a continuous matrix.

16. The article as recited in claim 15, wherein the vitreous glass comprises glassy silica.

17. The article as recited in claim 15, wherein the vitreous glass comprises polysilazane-derived glass.

18. The article as recited in claim 15, wherein the vitreous glass comprises silicate glass.

19. The article as recited in claim 18, wherein the silicate glass comprises aluminosilicate.

20. The article as recited in claim 15, wherein the ceramic matrix composite includes a continuous ceramic matrix phase, a fiber phase within the matrix phase and an interface coating between the matrix phase and the fiber phase.

21. The article as recited in claim 20, wherein the interface coating comprises boron.

22. The article as recited in claim 15, wherein the vitreous glass comprises ceramic frit-derived glass.

23. A turbine engine comprising:
a combustion section;
a gas passage leading from the combustion section and including a turbine section downstream of the combustion section and a nozzle downstream of the turbine section, the gas passage including a composite article having a ceramic matrix composite substrate with at least one surface exposed in the gas passage and a monocoating disposed directly on the at least one surface, the monocoating comprising vitreous glass in a discrete phase dispersed in a continuous matrix.

24. The turbine engine as recited in claim 23, wherein the ceramic matrix composite includes a continuous silicon-containing ceramic matrix phase, silicon carbide fibers within the matrix phase and a boron-containing interface coating between the matrix phase and the fibers.

* * * * *